Aug. 30, 1927.

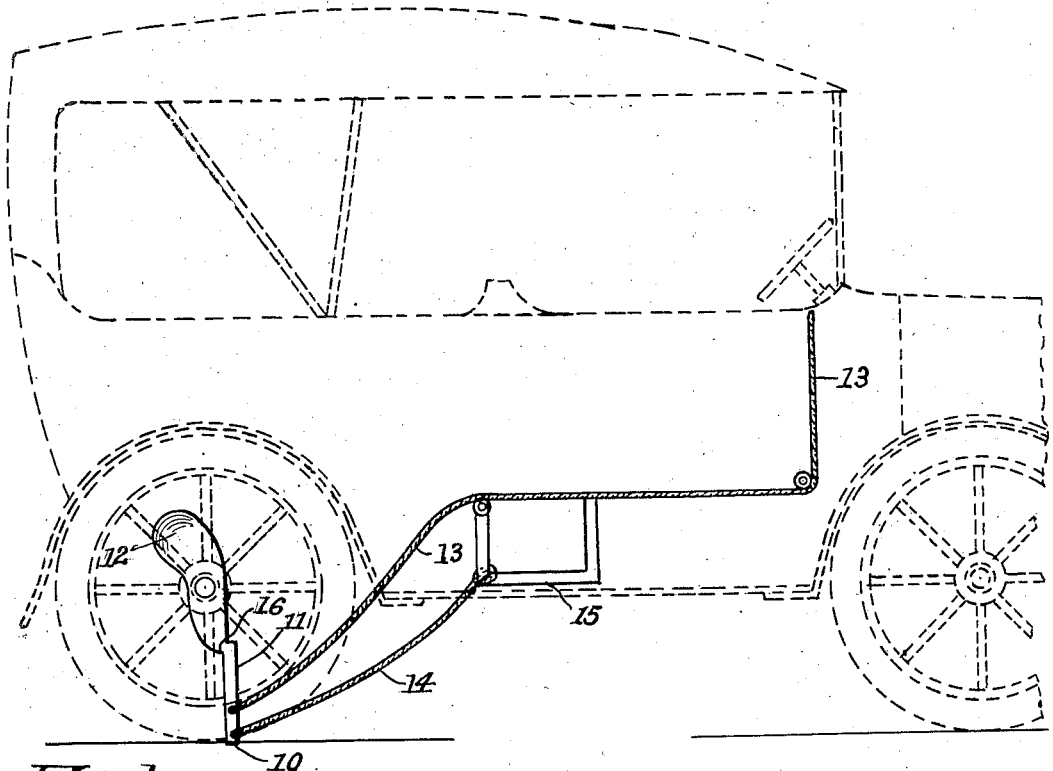
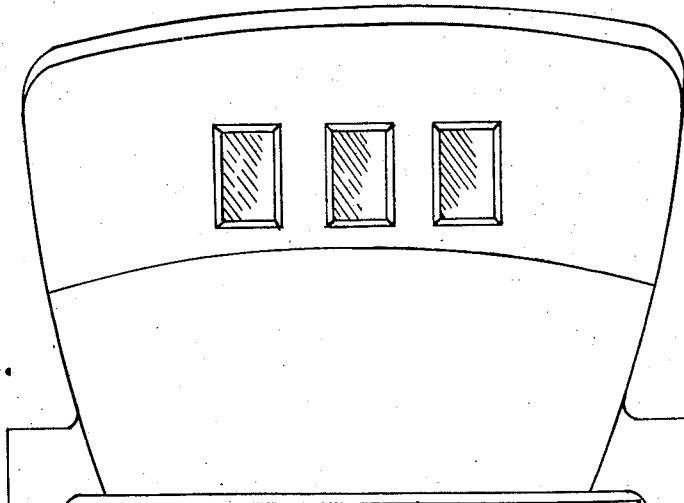
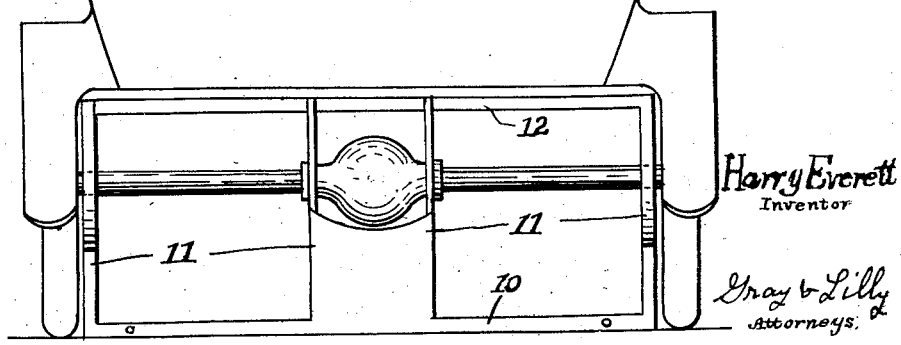

H. EVERETT 1,640,492

EMERGENCY BRAKE

Original Filed Nov. 7, 1922   2 Sheets-Sheet 2

Harry Everett,
*Inventor,*

Gray & Lilly
*Attorneys.*

Patented Aug. 30, 1927.

1,640,492

UNITED STATES PATENT OFFICE.

HARRY EVERETT, OF CASPER, WYOMING.

EMERGENCY BRAKE.

Application filed November 7, 1922, Serial No. 599,545. Renewed January 21, 1927.

My invention relates to a device for stopping autos, especially on smooth pavements and in slippery places. More particularly, it relates to devices where a pivotally supported member is normally raised, but in case of need may be lowered into direct contact with the surface over which the vehicle is moving and support a large part of the weight of the vehicle in sliding contact with such surface until the vehicle is stopped.

More particularly, my invention comprises various details set forth in the following description, shown in the drawings, and pointed out in the appended claims.

Referring to the accompanying drawings, showing one form of my invention:

Fig. 1 is a side view of my device attached to an auto and Fig. 2 is a rear view of the same.

The device comprises a contact member 10, mounted on arms 11. These arms are pivoted on an axle, as the rear axle of an auto and for example, and extend beyond the axle and carry on their extended ends counterbalancing weights, 12. In practice these weights are made so that the contact member will tend to drop by a force of from five to ten pounds. A cord, 13, is attached to member 10 to draw it up out of contact with the ground or pavement. Small cables, 14, are attached to a bracket, 15, on the frame of the auto and to the contact member in such a way that they will prevent the member from swinging so far to the rear as to become ineffective.

It will be noted that the arms, 11, are of such length that the weight of the auto will be taken from the wheels onto the contact member when the member is swung down. I prefer to form the arms with an offset, as at 16, so that when the member 10 is in perpendicular contact with the ground or pavement it will still be slightly in advance of the axle. This makes the member fully effective as a stopping device, and still allows it to be raised without excessive resistance.

Figure 3:
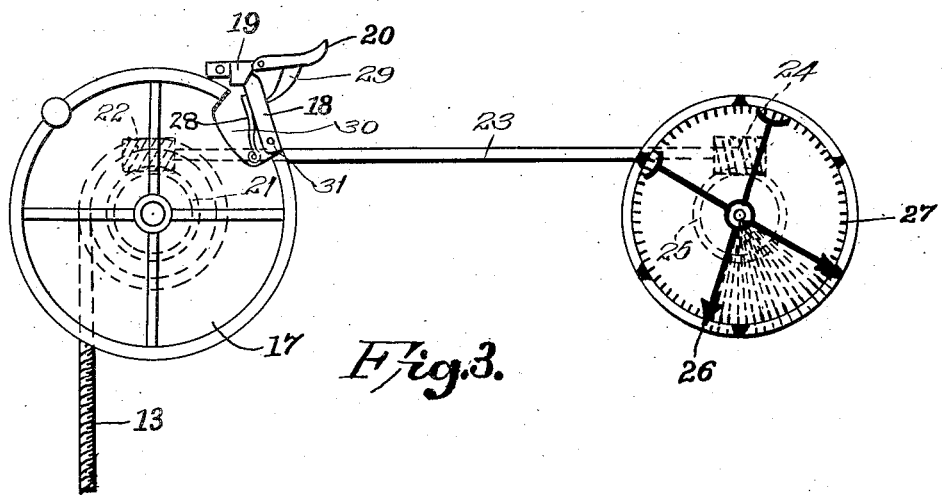
Fig. 3 is a front view and Fig. 4 a rear view of a windlass and indicator for operating the device.
Figure 4:
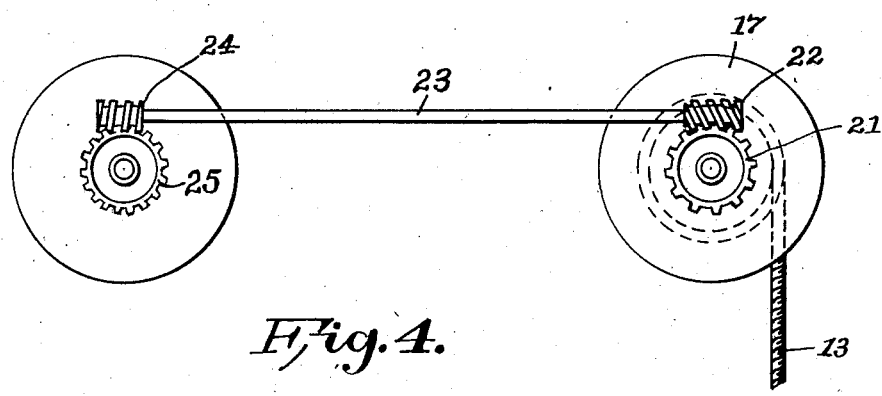

While the cord 13 might be operated in other ways, I prefer to lead it, as shown, to a windlass 17. The operating handwheel of the windlass is notched at 30 to receive a pawl 18 which is pivoted in the notch on the wheel and has a toe 31 which prevents the pawl from swinging outward farther than the position shown in Fig. 3. This pawl 18 is normally pressed outwardly by a spring 28, so that it will contact a fixed stop 19 and arrest movement of the windlass in a direction to lower member 10. The pawl readily slips past stop 19 when the windlass is turned to raise member 10. When the lowering of member 10 is desired, the pawl may be pressed down below stop 19 by pressing on the upper side of a trigger 20. The latter has a curved finger 29 which is adapted to press pawl 18 into the notch 30 and so slip past stop 19. As long as pressure is continued on trigger 20, the end of finger 29 rests on the periphery of the hand wheel, and the end of pawl 18 will encounter the finger 29 at each revolution in an unwinding direction, which would be counterclockwise as shown in Fig. 3.

I also show a spiral gear, 21, on the windlass meshing with a spiral gear, 22, on a rod, 23. On its other end the rod, 23, carries a worm, 24, engaging a wormwheel, 25, to which is attached a pointer, 26, which is adapted to indicate on an appropriate dial, 27, the position of the contact member.

While I have shown the device attached to an axle of an auto, it is obvious that it is capable of use with trucks, horse drawn vehicles, and probably many other types of wheeled vehicles which it is desired to positively stop.

Other changes may be made within the scope of the appended claims while retaining some of the advantages of my invention.

Having thus fully described my invention, what I claim is:

1. In a device of the character described, a contact member approximately the length of the distance between the wheels of a vehicle and pivoted upon the axle of a vehicle, a counterbalance on the other side of the axle partially counterbalancing the weight of the contact member, manually movable means governing the position of the member, and other means preventing the movement of the contact member to a position directly beneath the axle.

2. In a device of the character described, a contact member, arms pivotally mounted on the axle of a vehicle and carrying the member, means for swinging the member forward of the axle out of contact with the surface over which the vehicle travels and for allowing the member to drop down into contact with such surface, there being offsets in said arms whereby the contact member is in perpendicular contact with said surface before it is vertically under the axle, and means to prevent the movement of the contact member to a position vertically beneath the axle.

3. In a device of the character described, a contact member pivotally mounted on a vehicle to be swung into and out of contact with the surface over which the vehicle passes, means governing the position of the contact member, and an indicator connected to said means and indicating the position of the contact member.

4. In a device of the character described, a contact member pivotally mounted on a vehicle to be swung forward and upward out of contact with the surface over which the vehicle travels and backward and downward into contact with said surface, a cord for swinging the member upward and allowing it to swing downward, a windlass for operating said cord, a dial, and means connected to said windlass for indicating on the dial the action of the windlass and so the position of the contact member.

In testimony whereof I hereunto affix my signature.

HARRY EVERETT.